(12) United States Patent
Wilson

(10) Patent No.: US 6,859,490 B1
(45) Date of Patent: Feb. 22, 2005

(54) METHOD AND SYSTEM FOR WIRELESS COMMUNICATIONS USING DIFFERENT MODULATION TECHNIQUES TO PROVIDE GUARD TIMES

(75) Inventor: Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/490,979

(22) Filed: Jan. 24, 2000

(51) Int. Cl.[7] .................................................. H04L 5/16
(52) U.S. Cl. ....................... 375/220; 375/259; 370/282; 370/470; 455/102
(58) Field of Search ................................ 375/219, 220, 375/261, 273, 272, 279, 298, 302, 316, 259; 370/280, 282, 321, 326, 336, 442, 470, 476, 478; 455/73, 102, 142, 205; 329/316, 317; 330/108, 119, 120, 150

(56) References Cited

U.S. PATENT DOCUMENTS

| | | | | |
|---|---|---|---|---|
| 5,577,087 A | * | 11/1996 | Furuya | 375/377 |
| 5,663,958 A | * | 9/1997 | Ward | 370/347 |
| 5,883,884 A | * | 3/1999 | Atkinson | 370/279 |
| 6,285,681 B1 | * | 9/2001 | Kolze et al. | 370/442 |
| 6,330,230 B1 | * | 12/2001 | R.ang.s.ang.nen | 370/280 |
| 6,366,566 B1 | * | 4/2002 | Scott | 370/280 |
| 6,404,778 B1 | * | 6/2002 | Hayashi et al. | 370/470 |
| 6,456,627 B1 | * | 9/2002 | Frodigh et al. | 370/465 |

OTHER PUBLICATIONS

*iDen Operations/Technical Manual.* Motorola, Inc. 1993–1999.

* cited by examiner

*Primary Examiner*—Dac V. Ha
(74) *Attorney, Agent, or Firm*—Jeffrey K. Jacobs

(57) ABSTRACT

A method and system for wireless communications between a base transceiver station and a mobile unit which provides necessary guard times in the downlink signal burst while maintaining the same bit rate in both the downlink and uplink signal bursts is disclosed. Downlink signal bursts are modulated using a first modulation technique and uplink signal bursts are modulated using a second modulation technique. Preferably, the first modulation technique is a higher-order than the second modulation technique. The first modulation technique may be 16 QAM while the second modulation technique may be 4 QAM or π/4 QPSK.

20 Claims, 2 Drawing Sheets

METHOD AND SYSTEM FOR WIRELESS COMMUNICATIONS USING DIFFERENT MODULATION TECHNIQUES TO PROVIDE GUARD TIMES

FIELD OF THE INVENTION

The present invention relates generally to a method and system for communicating between a base transceiver station and a mobile unit, and more particularly, to a method and system for communicating which use downlink signal bursts and uplink signal burst having and equal number of bits and unequal time lengths to provide guard times needed for the mobile unit to transmit and receive, to correct for transmission delays, or errors and the like.

BACKGROUND OF THE INVENTION

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Communication systems are known to include a controller, a plurality of base transceiver stations, and a plurality of mobile units, such as mobile or portable two-way radios. Such communication systems allow information to be conveyed between two or more communication devices (e.g., between a mobile unit and a base station). One such communication system is a time division multiplexed (TDM) communication system. In a TDM system, one communication device typically transmits user information, such as voice or data, to another communication device via an assigned communication channel consisting of time slots of a radio frequency carrier. The time slots are generally assigned to the communication device by the controller in a repetitious manner known as an interleaving rate. A typical interleaving rate is 6-to-1. That is, the communication device assigned to a TDM channel transmits its respective data once every six time slots.

In narrowband digital radio systems, it is preferred that voice communications are duplexed. In such duplex radio systems, simultaneous two-way transmission (receiving and transmitting) in both directions is possible. One common method for implementing duplex communications is to provide a duplexer in both the base transceiver station and the mobile unit. A duplexer is a device which is able to simultaneously receive and transmit. However, due to design constraints, it is preferred that a mobile unit not include a duplexer. A duplexer is relatively expensive and increases the complexity of the relatively unstable and fragile mobile unit.

Consequently, the mobile unit needs both transmit-to-receive and receive-to-transmit guard times to assure proper operation. Unfortunately, TDM inherently does not provide for such guard times for the mobile unit. Prior systems have attempted to alleviate this problem by shortening the uplink signal bursts to create the necessary guard times. This solution however reduces the uplink bit rate and wastes transmit power.

Accordingly, there is a need in the art for a method and system which provides the necessary guard times while maintaining bit rates in the uplink and downlink.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

In accordance with one aspect of the present invention, a method is provided for communicating between a base transceiver station and a mobile unit. The method comprises the step of: transmitting a downlink signal burst from the base transceiver station to the mobile unit. The downlink signal burst contains a selected number of bits having a first time length. The method further comprises the step of transmitting an uplink signal burst from the mobile unit to the base transceiver station. The uplink signal burst contains the selected number of bits, or the same number as the downlink signal burst, while having a second time length. The first time length is shorter than the second time length and thereby provides guard time for the mobile unit to transmit and receive, to compensate for delays in transmission, to compensate for errors in transmission and the like. It should be understood that the guard time may contain no bits or may contain bits which are not directed to, or are meaningless to, the mobile unit. Thus, for descriptive purposes, the selected number of bits in the downlink signal burst are the bits which are intended to be transmitted to and received by the mobile unit. Since the present invention advantageously does not employ a duplexer in the mobile unit, the mobile unit needs guard time, for example, to switch from a transmit mode to a receive mode and, conversely, from a receive mode to a transmit mode.

Preferably, downlink and uplink signal bursts are formed using respective first and second modulation techniques. The first modulation technique preferably has a higher-order than the second modulation technique.

In accordance with another aspect of the present invention, a system for wireless communication comprises a base transceiver station for transmitting a downlink signal burst containing a selected number of bits having a first time length. A mobile unit transmits an uplink signal burst from the mobile unit to the base transceiver station. The uplink signal burst contains the selected number of bits having a second time length. The first time length is shorter than the second time length and thereby provides guard time for the mobile unit. It should be understood that the guard times will be primarily discussed with respect to providing time for the mobile unit to switch from transmit mode to receive mode and to switch from receive mode to transmit mode; however, there are other reasons to have guard times, such as to correct for delays or error in transmission or reception. The present invention advantageously provides guard times to compensate for all of these reasons.

Figure 1:
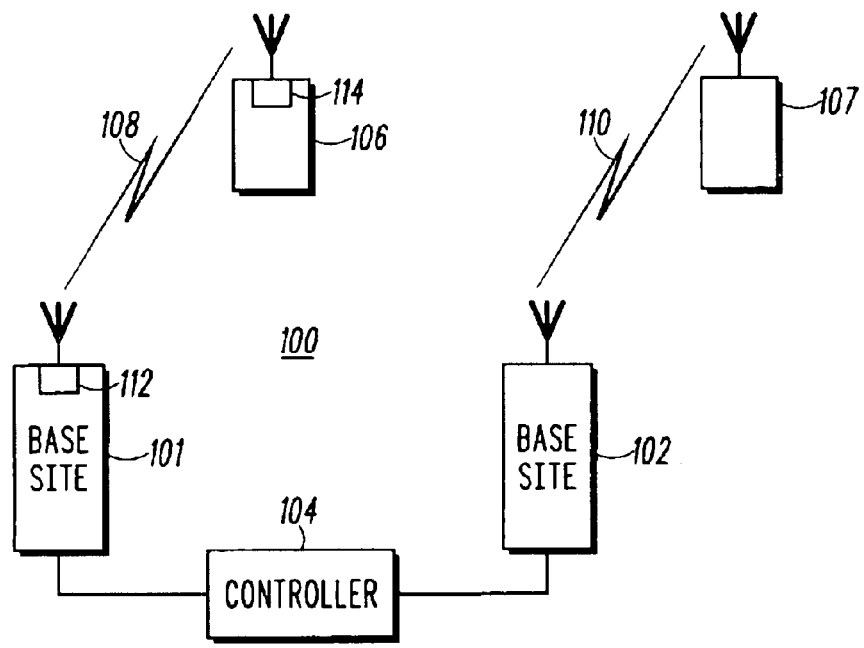
FIG. 1 is a block diagram of a system for communicating in accordance with an aspect of the present invention including a base transceiver station and a mobile unit.

Referring now to FIG. 1, a block diagram is provided depicting a radio communication system 100 that may beneficially employ the present invention. The radio communication system 100 includes a plurality of base transceiver stations, or sites, 101 and 102, a controller 104, and a plurality of mobile communication units 106 and 107. The radio communication system 100 preferably comprises a time division multiplexer (TDM) system, such as the "iDEN" digital trunking system manufactured by Motorola, Inc. Accordingly, the base stations 101 and 102 may comprise "iDEN" base stations and the controller may comprise an "iDEN" central controller. Each mobile unit 106 and 107 preferably comprises any mobile radio, portable radio, radiotelephone, two-way pager, or wireless data terminal. For purposes of this disclosure, the base stations 101 and 102 and the mobile units 106 and 107 are generally termed communication devices.

Signal transmissions from the base stations 101 and 102 to the mobile units 106 and 107 are generally designated as "downlink" transmissions and, conversely, signal transmissions from the mobile units 106 and 107 to the base stations 101 and 102 are generally designated as "uplink" transmissions. As will be apparent to those skilled in the art, the downlink channel and the uplink channel may be at different frequencies or they may be at the same frequency.

Each of the communication devices 101, 102, 106 and 107 transmits information to each another via communication channels 109 and 110. The communication channels 109 and 110 comprise one or more communication time slots assigned to a particular communication device 101, 102, 106, 107. The time slots are preferably conveyed between communication devices 101, 102, 106, 107 via radio frequency carriers. The quantity of time slots depends on the amount of information to be transmitted, while the timing of the time slot transmissions depends on the assigned time slot's interleave rate (i.e., the periodic rate at which information is transmitted).

Base station 101 contains a first modulation circuit 112 for modulating signals being transmitted to the mobile unit 106. A second modulation circuit 114 modulates signals being transmitted from the mobile unit 106. As will be set forth in more detail below, preferably first and second modulation circuits 112 and 114 use respective first and second modulation techniques.

Figure 2:
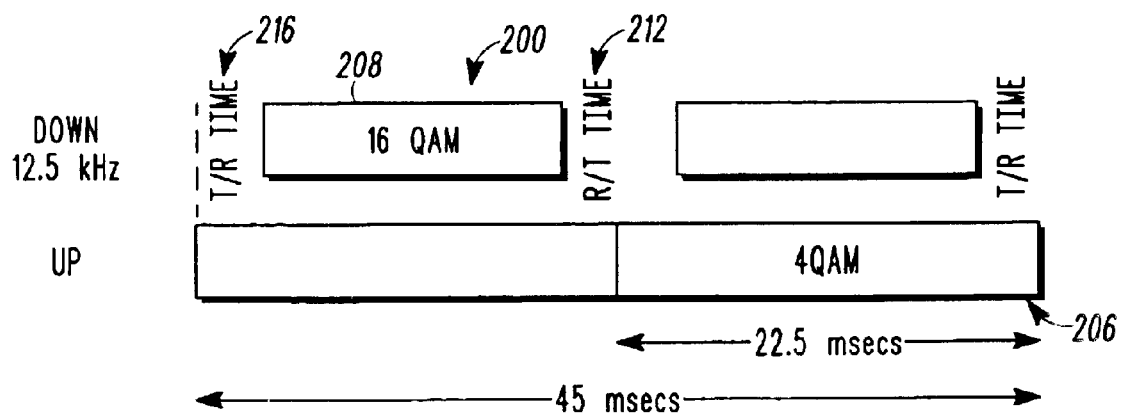
FIG. 2 is a graphical illustration of a downlink signal burst and an uplink signal burst which are transmitted from the base transceiver station and the mobile unit, respectively, shown in FIG. 1.

Referring now to FIG. 2, the communication channel 109 is depicted. For exemplary purposes, the channel 109 is a full duplex, TDM 12.5 kHz channel. A representation of a downlink signal burst 200 and an uplink signal burst 206 is shown in accordance with one aspect of the present invention. Each of the signal bursts 200 and 206 are positioned within 22.5 millisecond slots with the two slots comprising a frame of 45 milliseconds. It should be readily understood that the present invention will be described for exemplary purposes using a communication format for a communication system similar to the iDEN system, as described above. However, the present invention may be advantageously implemented in any communication system wherein guard times are desired.

The downlink signal burst 200 is preferably modulated using a first modulation technique, shown as sixteen (16) quadrature amplitude modulation (QAM), which is preferably performed by the first modulation circuit 112. The downlink signal burst 200 is comprised of a middle section 208, a receive-to-transmit guard time 212 and a transmit-to-receive guard time 216. The uplink signal burst 206 is preferably modulated using a second modulation technique, shown as four (4) QAM, which is preferably performed by the second modulation circuit 114 in the mobile unit 106. Alternatively, the second modulation circuit 114 may use π/4 quaternary phase shift keying (QPSK) as a second modulation technique.

In accordance with an aspect of the present invention, the first modulation technique (16 QAM) is a higher-order modulation technique than the second modulation technique (4 QAM or QPSK), therefore, the downlink signal burst 200 may contain the same payload data rate, as the uplink signal burst 204, even though the downlink signal burst 200 contains one half the number of payload symbols and the two guard times 212 and 216. As is known, a symbol is a unit of data. The order of a modulation technique determines the number of bits represented by a single symbol. The higher the order of modulation, the more bits are represented by a symbol.

By performing the higher-order modulation at the base station 101, the problems regarding power constraints and cost at the mobile unit 106 are overcome. The higher-order modulation technique requires a relatively significant amount of power. The base station 101 has sufficient power, since it is not operated typically by a battery, as is the mobile unit 106. Prior systems therefore generally used lower order modulation techniques in both the base station and the mobile unit. However, as noted above, performance suffered since uplink transmission had to be shortened to provide for guard times. Thus, the present invention provides a more efficient use of available channel space than prior systems.

Figure 3:
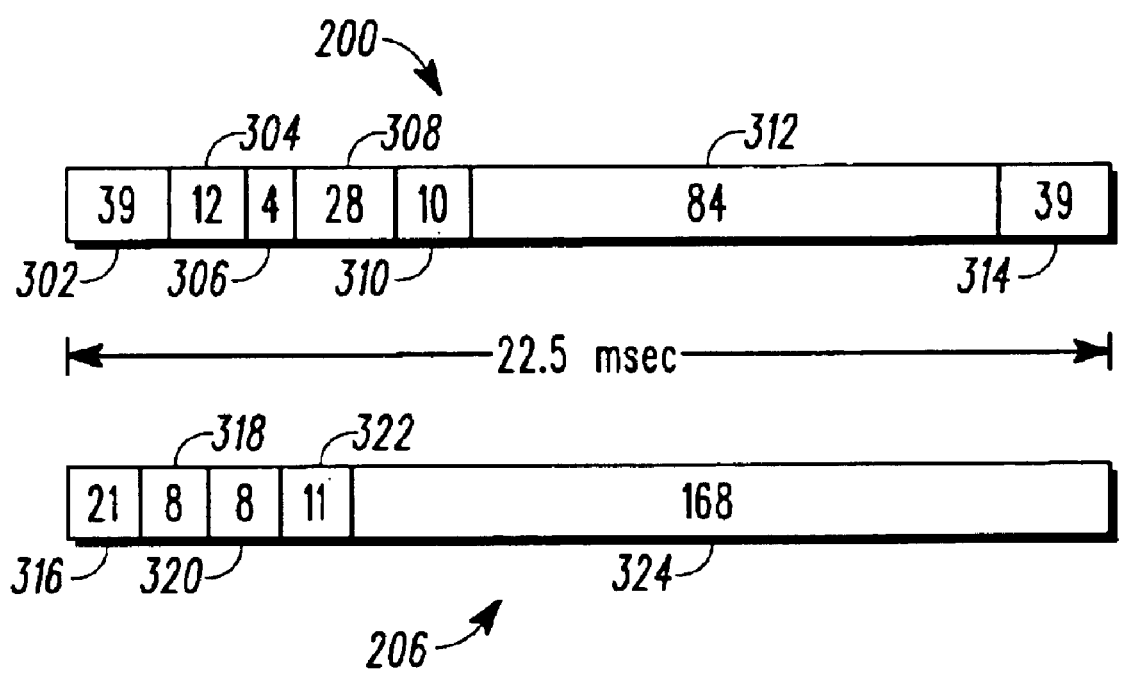
FIG. 3 is a detailed graphical illustration of the downlink signal burst and uplink signal burst shown in FIG. 2.

Referring now to FIG. 3, a more detailed illustration of the downlink signal burst 200 and the uplink signal burst 206 is shown. The downlink signal burst 200 comprises a 39 symbol receive-to-transmit (R-T) guard time 302, a 12 symbol sync field 304, a 4 symbol color field 306, a 28 symbol slot descriptor block 308, a 10 symbol pilot field 310, an 84 symbol payload field 312 and a 39 symbol transmit-to-receive (T-R) guard time 314. The guard times 302 and 314 in combination occupy a total guard time of 8.125 ms. Thus, providing sufficient guard time for the mobile unit 106 to change from transmit to receive mode without a duplexer. The uplink signal burst 206 includes a 21 symbol (or 1.875 millisecond) training sequence 316, an 8 symbol sync field 318, an 8 symbol color field 320, an 11 symbol pilot field and a 168 symbol payload field 324. Those skilled in the art will readily comprehend that, due to the different modulation techniques, the data rates for the payload fields 312 and 324 are equal even though the number of symbols in each are unequal. In the example set forth in this disclosure the payload data rate is 7466.67 bits per second for both the downlink and uplink signal bursts.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method for communicating between a base transceiver station and a mobile unit comprising the steps of:

transmitting a downlink signal burst from the base transceiver station to the mobile unit, the downlink signal burst containing a selected number of bits having a first time length; and transmitting an uplink signal burst from the mobile unit to the base transceiver station, the uplink signal burst containing the selected number of bits having a second time length, and wherein the first time length is shorter than the second time length thereby providing a guard time having a time length equal to the difference between the first time length and the second time length.

2. The method as recited in claim 1 wherein the guard time is sufficient for the mobile unit to switch from transmit to receive mode.

3. The me as recited in claim 1 comprising the steps of:

forming the downlink signal burst using a first modulation technique; and forming the uplink signal burst using a second modulation technique.

4. The method as recited in claim 3 wherein the first modulation technique has a higher-order than the second modulation technique.

5. The method as recited in claim 4 wherein the first modulation technique is quadrature amplitude modulation.

6. The method as recited in claim 5 wherein the quadrature amplitude modulation is sixteen quadrature amplitude modulation.

7. The method as recited in claim 6 wherein the second modulation technique is phase shift keying.

8. The method as recited in claim 7 wherein the phase shift keying is quaternary phase shift keying.

9. The method as recited in claim 5 wherein the second modulation technique is quadrature amplitude modulation.

10. The method as recited in claim 9 wherein the second modulation technique is four quadrature amplitude modulation.

11. The method as recited in claim 1 wherein the second time length is approximately 22.5 milliseconds long.

12. The method as recited in claim 11 wherein a total of the guard time is approximately 8.125 milliseconds.

13. A system for wireless communication comprising:

a base transceiver station for transmitting a downlink signal burst containing a selected number of bits having a first time length; and a mobile unit for transmitting an uplink signal burst containing the selected number of bits having a second time length, from the mobile unit to the base transceiver station, and wherein the first time length is shorter than the second time length thereby providing a guard time having a time length equal to the difference between the first time length and the second time length.

14. The system as recited in claim 13 wherein the guard time is sufficient for the mobile unit to switch from transmit to receive mode.

15. The system as recited in claim 13 wherein the base transceiver station comprises a first modulation circuit for modulating the downlink signal burst using a first modulation technique.

16. The system as recited in claim 15 wherein the mobile unit comprises a second modulation circuit for modulating the uplink signal burst using a second modulation technique.

17. The system as recited in claim 16 wherein the first modulation technique is a higher-order modulation than the second modulation technique.

18. The system as recited in claim 17 wherein the first modulation circuit comprises a quadrature amplitude modulator.

19. The system as recited in claim 17 wherein the second modulation circuit comprises a phase shift keying modulator.

20. The system as recited in claim 17 wherein the first time length is approximately four milliseconds more than the second time length.

* * * * *